G. ALBANESE.
GRATER FOR CULINARY USE.
APPLICATION FILED FEB. 19, 1915.
1,158,153.
Patented Oct. 26, 1915.
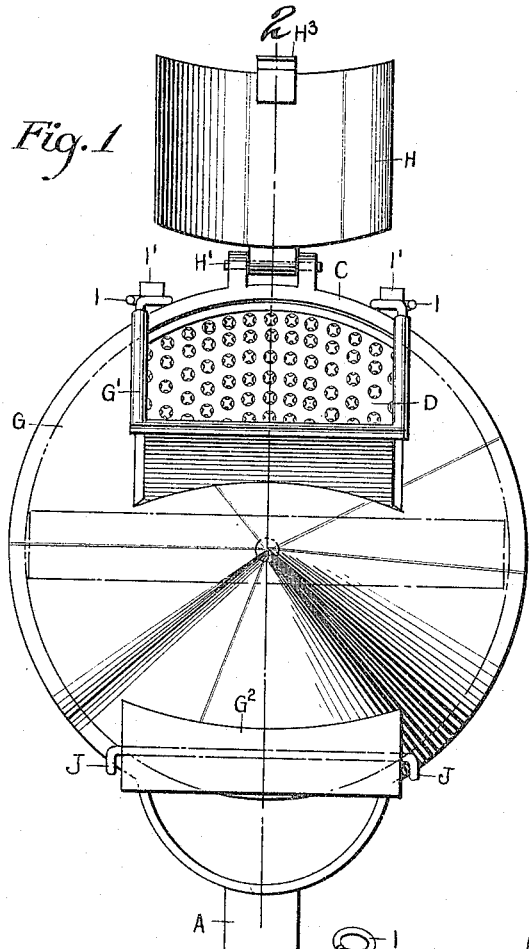
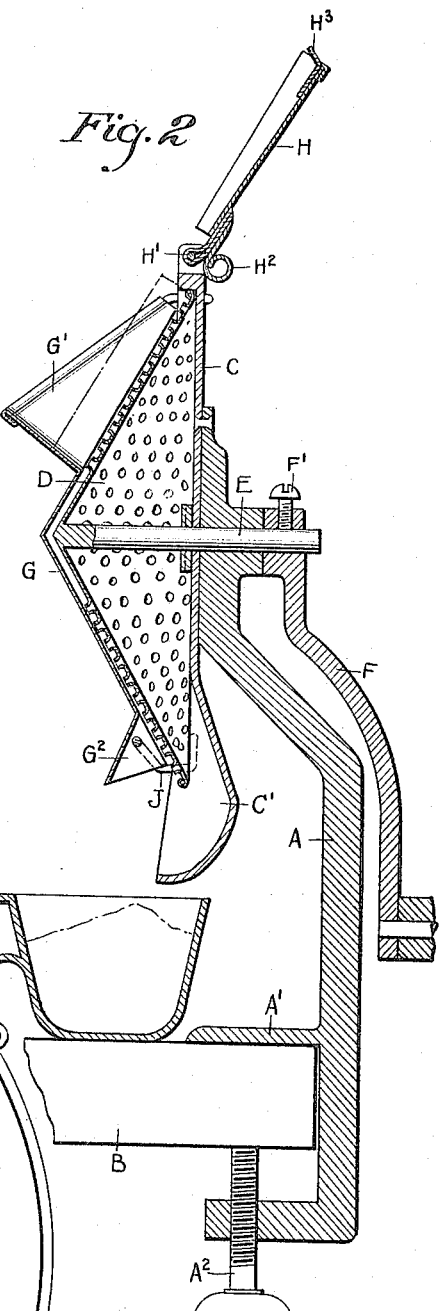
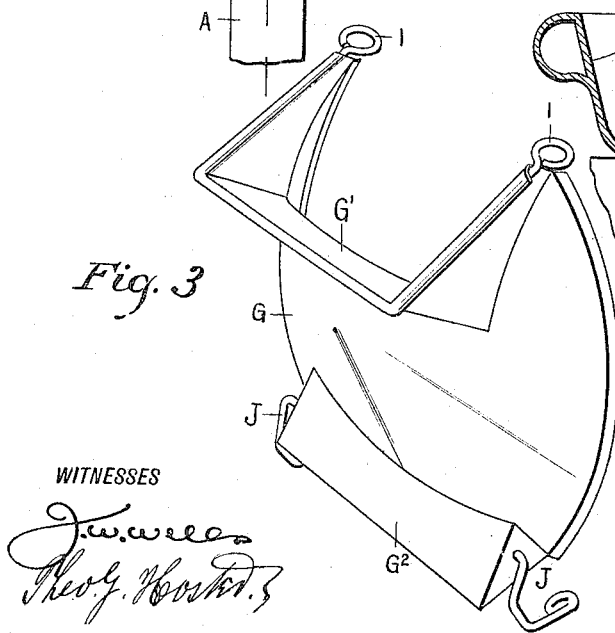
WITNESSES
INVENTOR
Gaetano Albanese
BY
ATTORNEYS

UNITED STATES PATENT OFFICE.

GAETANO ALBANESE, OF NEW YORK, N. Y.

GRATER FOR CULINARY USE.

1,158,153.      Specification of Letters Patent.      Patented Oct. 26, 1915.

Application filed February 19, 1915. Serial No. 9,291.

*To all whom it may concern:*

Be it known that I, GAETANO ALBANESE, a subject of the King of Italy, and a resident of the city of New York, borough of Manhattan, in the county and State of New York, have invented a new and Improved Grater for Culinary Use, of which the following is a full, clear, and exact description.

The object of the invention is to provide a new and improved grater more especially designed for household use for grating pieces of cheese, bread or other soft materials and arranged to enable the user to grind the piece to the last portion without danger of cutting or injuring the fingers and to permit of convenient cleaning of the grater.

In order to accomplish the desired result, use is made of a casing having a conical cover provided in its side above the apex with a hopper for containing the material to be ground, and a revoluble grating cone within the said casing and having its grating surface in close proximity to the inner surface of the said cover and exposed in the said hopper. Use is also made of a follower hinged on the casing and adapted to pass into the hopper to press the piece of material in contact with the grating surface of the cone.

A practical embodiment of the invention is represented in the accompanying drawings forming a part of this specification, in which similar characters of reference indicate corresponding parts in all the views.

Figure 1 is a front elevation of the grater with the follower in uppermost inactive position; Fig. 2 is a cross section of the same on the line 2—2 of Fig. 1; and Fig. 3 is a perspective view of the cover.

The frame for supporting the grater is preferably in the form of a bracket A provided at its lower end with a flange A' and a clamping screw $A^2$ for fastening the bracket A in upright position on a table or other support B. To the upper end of the bracket A is riveted or otherwise secured a back plate C of circular shape and provided at its lower end with a depending chute C'. In front of the back plate C is arranged a grating cone D provided with the usual grating surface and centrally secured on a transverse shaft E mounted to rotate in the upper end of the bracket A. The rear end of the shaft E is provided with a crank arm F under the control of the user for turning the shaft E and the cone D. A set screw F is preferably used for removably fastening the crank arm F to the shaft E to permit the user to conveniently remove the grating cone C from in front of the back plate C after the crank arm F is detached from the shaft E. It will also be noticed that by the arrangement described the hub of the crank arm F holds the face of the grating cone D in close proximity to the front face of the back plate C. A conical cover G extends over the grating cone D and the grating surface of the cone D is in close proximity to the inner surface of the cover G. The cover G is provided in its side above its apex with a hopper G' for containing the piece of cheese or other material to be pressed in contact with the grating surface of the cone D and which grating surface is exposed to a hopper G' and consequently to the material held thereon.

In order to press the last portion of the piece of material in contact with the grating surface of the cone D and without the user injuring the fingers, use is made of a follower H hinged at H' on the top of the back plate C to permit of swinging the follower H into the hopper G for the purpose above mentioned. The follower H is preferably arched in a longitudinal direction to properly confine the piece of material in the hopper G to the very last portion. The follower H is provided with a handle $H^2$ for conveniently swinging the follower in or out of the hopper G. The free end of the follower H is provided with a lug $H^3$ serving as a stop to limit the inward movement of the follower H in the hopper G at the time the material is ground up by the grater, the said lug $H^3$ then resting on the smooth apex portion of the cone D. The cover G is provided at its lower portion with a chute $G^2$ to permit escape of the material that passes between the inner surface of the cover G and the grating surface of the cone D, it being understood that the material that passes through the grating surface into the interior of the cone D drops down into the chute $G^2$ from which the material can pass into a suitable receptacle held on the table B together with the material that drops through the chute $G^2$. The cover G is removably held on the back plate C and for this purpose use is made of eyes I attached to the upper edges of the sides of the hopper G' and engaging lugs I' formed on the top of the back plate C on opposite sides of the hinge H'. A catch J is mounted on the chute G² and is adapted to engage the back plate C at the lower portion thereof to lock the cover G in position on the back plate. When the catch J is swung into an open position then the cover G can be lifted to disengage the eyes I from the lugs I' thus detaching the cover G from the grater. When the cover G is removed and likewise the crank arm F then the cone D can be detached to permit convenient cleaning of the various parts after the grater has been used in the manner above described.

Having thus described my invention, I claim as new and desire to secure by Letters Patent:

1. A grater comprising a frame having a back plate, a grating cone having its base engaging the back plate and provided with a shaft secured to its inner face at the apex and extending through the back plate and frame, a crank handle removably secured to the projecting end of the shaft in engagement with the frame, and a conical cover removably secured to the back plate over the grating with its edge in engagement with the back plate, said cover having a hopper in one side above the apex and a discharge chute in its lower portion.

2. A grater, comprising a frame, a vertically disposed back plate secured to the said frame, a conical cover removably mounted on the face of the said back plate and forming with the latter a casing, the said cover being provided in its side with a hopper for holding the material to be ground and with a discharge chute, a revoluble grating cone in the said casing and having it base next to the back plate and its grating surface in close proximity to the inner surface of the said cover and exposed in the said hopper, and a follower hinged to the said back plate and adapted to pass into the said hopper to press the material against the conical grating surface of the said cone.

3. A grater, comprising a bracket adapted to be clamped to a support, a vertically disposed circular back plate secured to the said bracket and provided at the top with spaced lugs and at the bottom with a depending chute, a transverse shaft journaled in the said back plate and provided at its rear end with a crank arm for turning the shaft, a grating cone attached to the said shaft and disposed in front of the said back plate, a conical cover extending over the said grating cone and provided on top with eyes detachably engaging the said lugs, the cover having a hopper in its side above the apex for the reception of the material to be ground, and the locking catch on the lower end of the cover and adapted to engage the back plate to removably lock the cover in place on the back plate.

4. In a grater, the combination of a back plate having lugs at the top, a grating cone having its shaft mounted in the back plate, a cover for the cone, said cover having eyes engaging the lugs of the back plate and provided with a hopper, and a catch for locking the cover in position.

5. In a grater, the combination of a back plate having a chute at its bottom, a grating cone mounted on the back plate, a cover for the cone removably hinged to the back plate, said cover having a hopper in its upper portion and a discharge chute in its lower portion opposite the chute of the back plate, and means for securing the free end of the cover to the back plate.

In testimony whereof I have signed my name to this specification in the presence of two subscribing witnesses.

GAETANO ALBANESE.

Witnesses:
   THEO. G. HOSTER,
   PHILIP D. ROLLHAUS.

Copies of this patent may be obtained for five cents each, by addressing the "Commissioner of Patents, Washington, D. C."